United States Patent
Nie et al.

(10) Patent No.: US 9,245,560 B1
(45) Date of Patent: Jan. 26, 2016

(54) DATA STORAGE DEVICE MEASURING READER/WRITER OFFSET BY READING SPIRAL TRACK AND CONCENTRIC SERVO SECTORS

(71) Applicant: Western Digital Technologies, Inc., Irvine, CA (US)

(72) Inventors: Jianbin Nie, Fremont, CA (US); Charles A. Park, Aromas, CA (US); Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/642,684

(22) Filed: Mar. 9, 2015

(51) Int. Cl.
*G11B 21/02* (2006.01)
*G11B 5/596* (2006.01)

(52) U.S. Cl.
CPC ........ *G11B 5/59666* (2013.01); *G11B 5/59661* (2013.01)

(58) Field of Classification Search
None
See application file for complete search history.

(56) References Cited

U.S. PATENT DOCUMENTS

| | | | |
|---|---|---|---|
| 5,668,679 A * | 9/1997 | Swearingen et al. | ........... 360/75 |
| 5,754,352 A | 5/1998 | Behrens et al. | |
| 6,005,727 A | 12/1999 | Behrens et al. | |
| 6,014,283 A | 1/2000 | Codilian et al. | |
| 6,021,012 A | 2/2000 | Bang | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,191,906 B1 | 2/2001 | Buch | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,318 B1 | 9/2001 | Hayashi | |
| 6,292,320 B1 | 9/2001 | Mason et al. | |
| 6,304,407 B1 | 10/2001 | Baker et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,411,453 B1 | 6/2002 | Chainer et al. | |
| 6,462,896 B1 | 10/2002 | Codilian et al. | |

(Continued)

*Primary Examiner* — K. Wong

(57) ABSTRACT

A data storage device is disclosed comprising a disk comprising a spiral track, and a head actuated over the disk, wherein the head comprises a read element offset radially from a write element by a reader/writer offset. The spiral track is first read to write a plurality of concentric servo sectors on the disk that define at least one concentric servo track on the disk. The spiral track is second read and the concentric servo sectors are read to measure the reader/writer offset.

14 Claims, 5 Drawing Sheets

(56) References Cited

U.S. PATENT DOCUMENTS

| | | |
|---|---|---|
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,519,107 B1 | 2/2003 | Ehrlich et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,587,293 B1 | 7/2003 | Ding et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,704,156 B1 | 3/2004 | Baker et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,205 B1 | 5/2004 | Moran et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,978 B1 | 9/2005 | Lee |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,799 B1 | 11/2005 | Lee |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,985,316 B1 | 1/2006 | Liikanen et al. |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,002,761 B1 | 2/2006 | Sutardja et al. |
| 7,006,320 B1 | 2/2006 | Bennett et al. |
| 7,016,134 B1 | 3/2006 | Agarwal et al. |
| 7,019,937 B1 | 3/2006 | Liikanen et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,533 B1 | 8/2006 | Shepherd et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,133,233 B1 | 11/2006 | Ray et al. |
| 7,136,253 B1 | 11/2006 | Liikanen et al. |
| 7,145,744 B1 | 12/2006 | Clawson et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,230,786 B1 | 6/2007 | Ray et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,256,956 B2 | 8/2007 | Ehrlich |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,286 B2 | 2/2008 | Jung et al. |
| 7,333,290 B1 | 2/2008 | Kupferman |
| 7,339,761 B1 | 3/2008 | Tu et al. |
| 7,365,932 B1 | 4/2008 | Bennett |
| 7,382,564 B1 | 6/2008 | Everett et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,405,897 B2 | 7/2008 | Dougherty et al. |
| 7,411,758 B1 | 8/2008 | Cheung et al. |

(56) References Cited

U.S. PATENT DOCUMENTS

| | | | |
|---|---|---|---|
| 7,414,809 B2 | 8/2008 | Smith et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,522,370 B1 | 4/2009 | Sutardja |
| 7,529,055 B1 | 5/2009 | Laks et al. |
| 7,542,225 B1 | 6/2009 | Ding et al. |
| 7,548,392 B1 | 6/2009 | Desai et al. |
| 7,551,387 B2 | 6/2009 | Sun et al. |
| 7,551,390 B1 | 6/2009 | Wang et al. |
| 7,558,016 B1 | 7/2009 | Le et al. |
| 7,561,361 B1 | 7/2009 | Rutherford |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 * | 9/2009 | Chen et al. ............... 360/77.04 |
| 7,595,954 B1 | 9/2009 | Chen et al. |
| 7,602,575 B1 * | 10/2009 | Lifchits et al. ............... 360/75 |
| 7,616,399 B1 | 11/2009 | Chen et al. |
| 7,619,844 B1 | 11/2009 | Bennett |
| 7,619,846 B2 | 11/2009 | Shepherd et al. |
| 7,623,313 B1 | 11/2009 | Liikanen et al. |
| 7,626,782 B1 | 12/2009 | Yu et al. |
| 7,630,162 B2 | 12/2009 | Zhao et al. |
| 7,639,445 B2 | 12/2009 | Matsunaga et al. |
| 7,639,446 B2 | 12/2009 | Mizukoshi et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,705 B2 | 3/2010 | Mizukoshi et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 * | 3/2010 | Bryant et al. ............... 360/75 |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,715,143 B2 | 5/2010 | Bliss et al. |
| 7,728,539 B2 | 6/2010 | Smith et al. |
| 7,729,079 B1 | 6/2010 | Huber |
| 7,733,189 B1 | 6/2010 | Bennett |
| 7,733,588 B1 | 6/2010 | Ying |
| 7,737,793 B1 | 6/2010 | Ying et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,751,144 B1 | 7/2010 | Sutardja |
| 7,760,461 B1 | 7/2010 | Bennett |
| 7,787,211 B2 | 8/2010 | Kim et al. |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,852,598 B1 | 12/2010 | Sutardja |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,881,004 B2 | 2/2011 | Kumbla et al. |
| 7,881,005 B1 | 2/2011 | Cheung et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |

(56) References Cited

U.S. PATENT DOCUMENTS

| | | |
|---|---|---|
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2006/0171059 A1 | 8/2006 | Chan et al. |
| 2007/0070538 A1 | 3/2007 | Lau et al. |
| 2007/0076314 A1 | 4/2007 | Rigney |
| 2007/0211367 A1 | 9/2007 | Lau et al. |
| 2007/0291401 A1 | 12/2007 | Sun et al. |
| 2009/0086357 A1 | 4/2009 | Ehrlich |
| 2010/0035085 A1 | 2/2010 | Jung et al. |
| 2011/0216438 A1 | 9/2011 | Szita |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

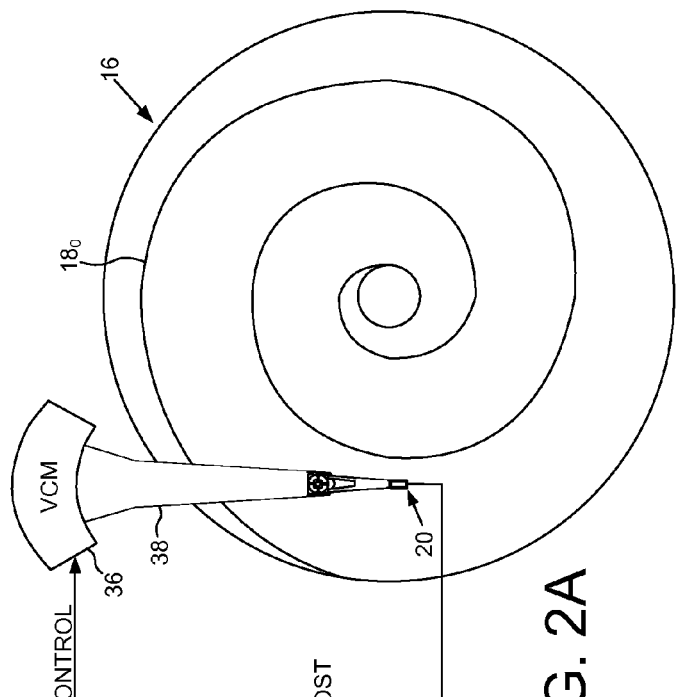
FIG. 2A
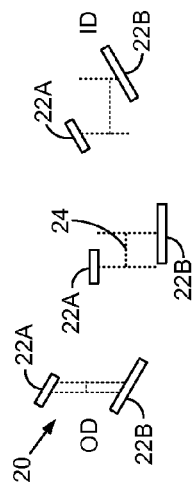
FIG. 2B
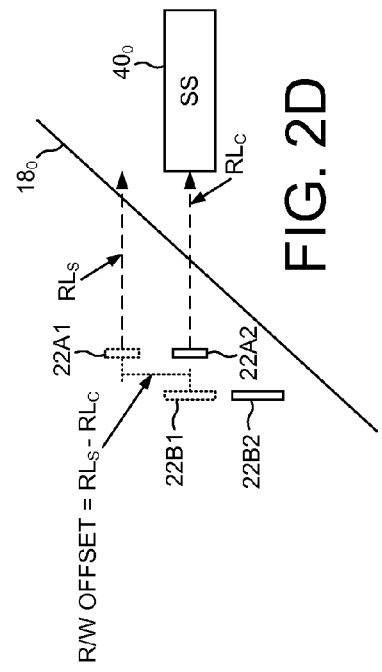
FIG. 2C
FIG. 2D

DATA STORAGE DEVICE MEASURING READER/WRITER OFFSET BY READING SPIRAL TRACK AND CONCENTRIC SERVO SECTORS

BACKGROUND

When manufacturing a data storage device such as a disk drive, concentric servo sectors $2_0$-$2_N$ are written to a disk 4 which define a plurality of radially-spaced, concentric servo tracks 6 as shown in the prior art disk format of FIG. 1. A plurality of concentric data tracks are defined relative to the servo tracks 6, wherein the data tracks may have the same or a different radial density (tracks per inch (TPI)) than the servo tracks 6. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target data track during a seek operation, and the servo bursts 14 are processed to maintain the head over a centerline of the target data track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 2A shows a data storage device in the form of a disk drive according to an embodiment comprising a head actuated over a disk.

FIG. 2B shows an embodiment wherein the head comprises a read element offset radially from a write element by a reader/writer offset.

FIG. 2C is a flow diagram according to an embodiment wherein a spiral track and concentric servo sectors are read in order to measure the reader/writer offset.

FIG. 2D illustrates an example embodiment wherein a spiral track and concentric servo sectors are read in order to measure the reader/writer offset.

DETAILED DESCRIPTION

Figure 1:
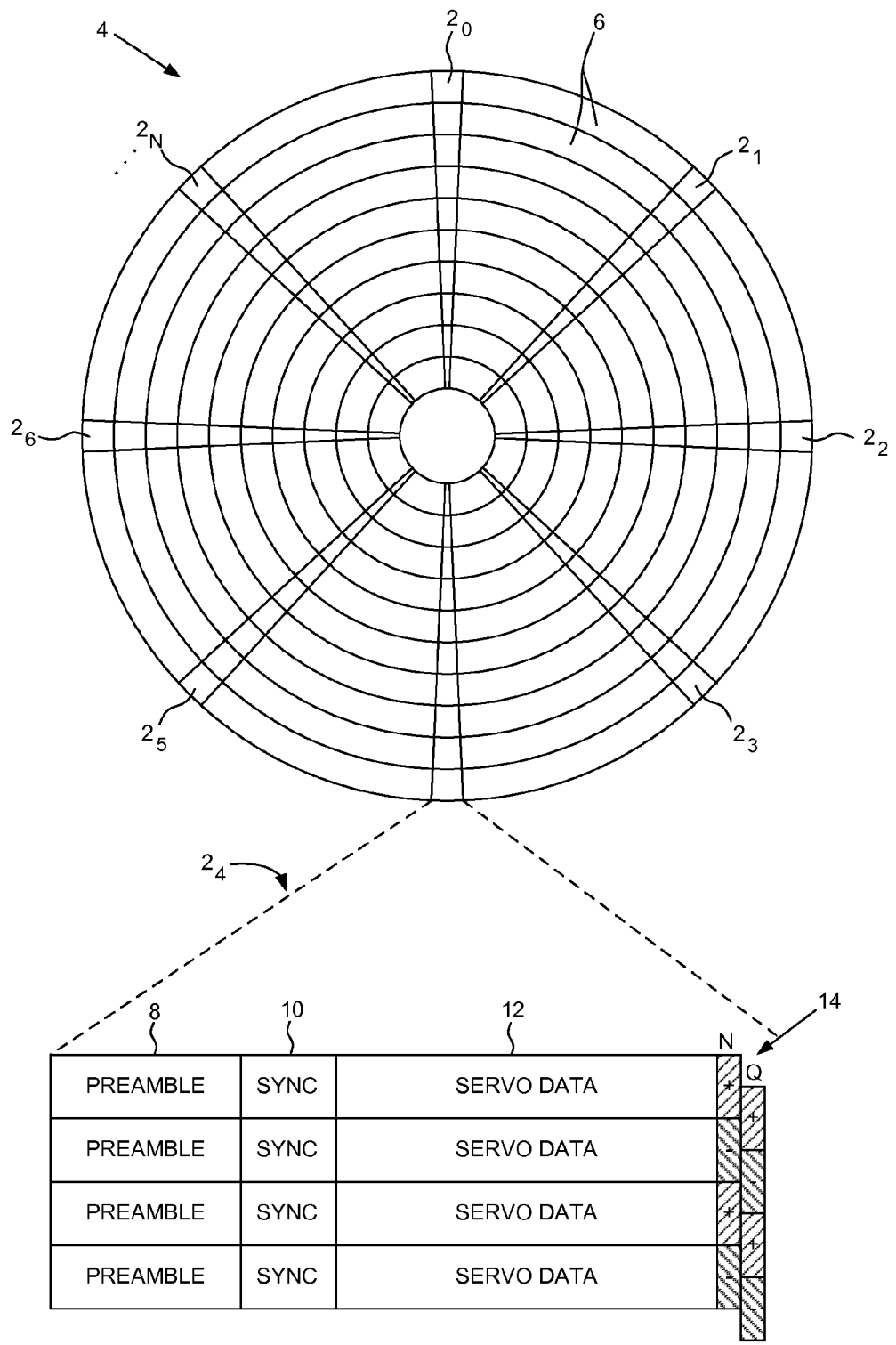
FIG. 1 shows a prior art disk format comprising a plurality of servo tracks defined by servo sectors.

FIG. 2A shows a data storage device in the form of a disk drive according to an embodiment comprising a disk 16 comprising a spiral track 18$_0$, and a head 20 actuated over the disk 16, wherein the head 20 comprises a read element 22A offset radially from a write element 22B by a reader/writer offset 24 (FIG. 2B). The disk drive further comprises control circuitry 26 configured to execute the flow diagram of FIG. 2C, wherein the spiral track is first read to write a plurality of concentric servo sectors on the disk that define at least one concentric servo track on the disk (block 28). The spiral track is second read and the concentric servo sectors are read to measure the reader/writer offset (block 30).

Figure 3A:
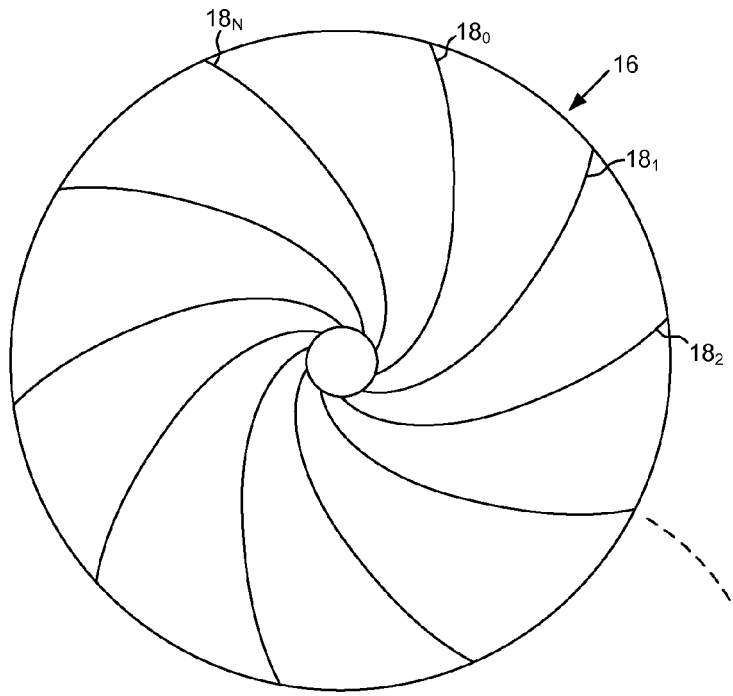
FIGS. 3A and 3B show an embodiment wherein concentric servo sectors are written to the disk while servoing the head over the disk based on a plurality of spiral tracks.

In the embodiment of FIG. 2A, the control circuitry 26 processes a read signal 32 emanating from the head 20 to demodulate the spiral track 18$_0$ and generate a position error signal (PES) representing an error between the actual position of the head and a target position. The control circuitry 26 filters the PES using a suitable compensation filter to generate a control signal 34 applied to a voice coil motor (VCM) 36 which rotates an actuator arm 38 about a pivot in order to actuate the head 20 radially over the disk 16 in a direction that reduces the PES. In an embodiment shown in FIGS. 3A and 3B, the disk 16 may comprise a plurality of spiral tracks 18$_0$-18$_N$ which may be demodulated by the control circuitry 26 in order to servo the head 20 radially over the disk 16 while writing a plurality of concentric servo sectors 40$_0$-40$_N$ that define a plurality of concentric servo tracks. The embodiment of FIG. 3A shows each spiral track 18, may be written over a partial revolution of the disk 16, whereas in an alternative embodiment, each spiral track 18, may be written over multiple revolutions of the disk 16 as shown in FIG. 2A.

Referring again to FIG. 2B, the read element 22A may be offset radially from the write element 22B, and therefore when writing to the disk 16 and/or when reading from the disk 16 a "jog" value is added to the servo system to account for the reader/writer offset 24. Since the jog value may change across the radius of the disk due to the skew angle of the head 20 as illustrated in FIG. 2B, a jog profile may be calibrated that spans the radius of the disk surface. The jog profile is then used to generate a jog value corresponding to the radial location of the head when accessing a target data track on the disk surface.

In one embodiment illustrated in FIG. 2D, the control circuitry 26 measures the reader/writer offset 24 by reading the spiral track $18_0$ and the concentric servo sectors (e.g., servo sector $40_0$) written by servoing off of the spiral track $18_0$. The measurement may be made during the process of servo writing the concentric servo sectors $40_0$-$40_N$ or after writing the concentric servo sectors $40_0$-$40_N$. In the example of FIG. 2D, the read element 22A1 may be positioned at radial location RLs by reading the spiral track $18_0$ while writing concentric servo sector $40_0$ using the write element 22B1 positioned at radial location RLc. When the read element 22A2 reads the center of concentric servo sector $40_0$, the read element 22A2 is positioned at radial location RLc, and therefore the reader/writer offset 24 may be measured as the difference between RLs and RLc.

In one embodiment, the radial location RLs generated by reading the spiral track $18_0$ may be written into the concentric servo sector $40_0$. That is, when servoing the read element 22A1 at the center of a servo track defined by the spiral track $18_0$, the corresponding radial location RLs is written as the center of a corresponding servo track (defined by servo sector $40_0$) at radial location RLc. In this manner, when the read element 22A2 is positioned at radial location RLc, the reader/writer offset 24 may be measured as the difference between the radial location as defined by reading the spiral track $18_0$ at radial location RLc and the radial location as defined by reading the concentric servo sector $40_0$ at radial location RLc.

Figure 4A:
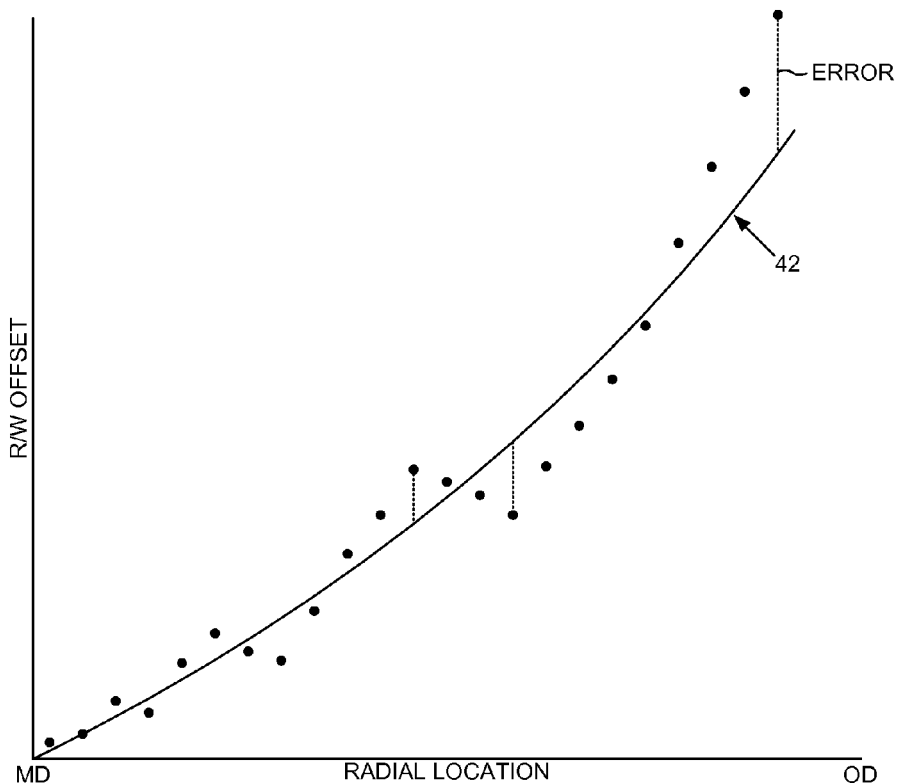
FIG. 4A shows an embodiment wherein the reader/writer offset is measured at a number of discrete radial locations, the data points are curve fitted to a suitable polynomial, and a reader/writer offset error is generated at each of the different radial locations based on a difference between the measured reader/writer offset and a nominal reader/writer offset generated based on the polynomial.

If the shape of the spiral tracks $18_0$-$18_N$ (e.g., slope) varies across the disk surface from an optimal shape, the error will propagate through to the concentric servo sectors $40_0$-$40_N$ causing a variable track squeeze of the concentric servo tracks. The error in the shape of the spiral tracks $18_0$-$18_N$ may also cause an error when measuring the reader/writer offset 24. Referring to FIG. 4A, the fixed geometry of the head 20 means the actual reader/writer offset 24 will vary across the radius of the disk along a continuous curve 42 which may be represented as a polynomial. The reader/writer offset 24 (represented as black dots) measured at different radial locations will deviate from the curve 42 due to a reader/writer offset error caused by the imperfect spiral tracks $18_0$-$18_N$. In one embodiment, the reader/writer offset error may be measured at each radial location by curve fitting the reader/writer offset measurements to a polynomial curve 42 such as shown in FIG. 4A, and then computing the difference between each reader/writer offset measurement and the curve 42.

Figure 4B:
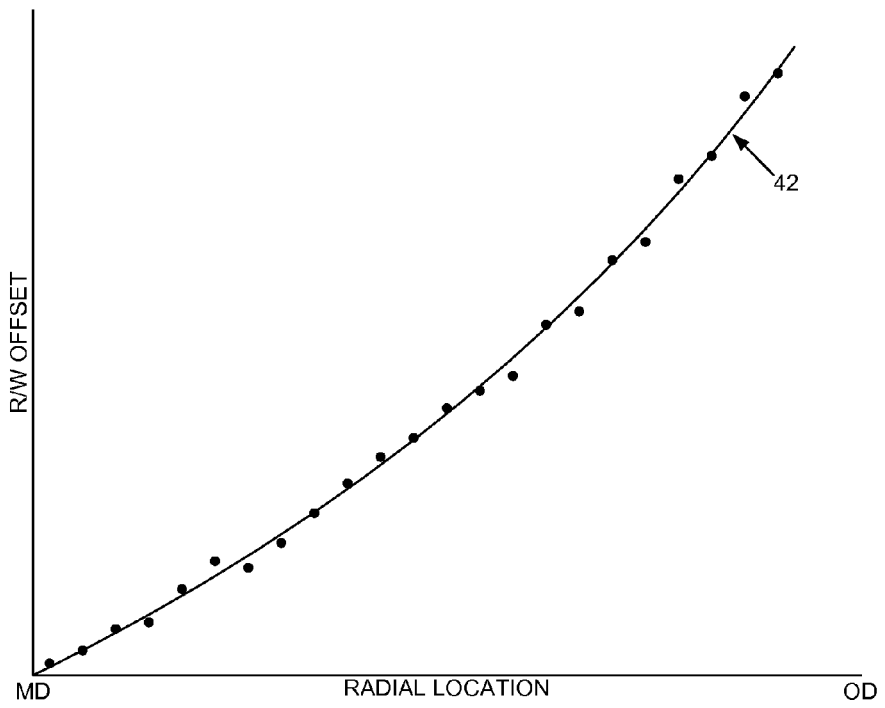
FIG. 4B shows an embodiment wherein after rewriting the concentric servo sectors based on the spiral tracks and the reader/writer offset errors, the reader/writer offset errors are reduced.

The reader/writer offset errors shown in FIG. 4A may be used in any suitable manner. In one embodiment, the reader/writer offset errors may be used to screen out disk surfaces when the errors are excessive and/or to improve the process of writing the spiral tracks $18_0$-$18_N$ to the disk 16. For example, in one embodiment the spiral tracks $18_0$-$18_N$ may be erased and then rewritten to the disk 16 if the reader/writer offset errors are excessive. In another embodiment described below, the reader/writer offset errors may be used to rewrite the concentric servo sectors $40_0$-$40_N$ over at least part of the disk radius in a manner that reduces the reader/writer offset errors and corresponding variance in the track squeeze of the concentric servo tracks. That is, the reader/writer offset errors may be used to adjust the radial location generated by reading the spiral tracks $18_0$-$18_N$, thereby adjusting the radial location of the concentric servo tracks. When the reader/writer offset is again measured after rewriting the concentric servo sectors over at least part of the disk radius, the reader/writer offset measurement errors will decrease as illustrated in FIG. 4B. That is, each reader/writer offset measurement will be closer to the curve 42 that represents the actual reader/writer offset.

Figure 5A:
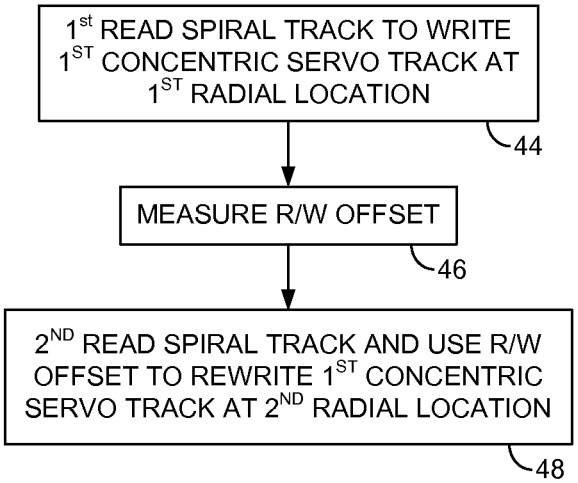
FIG. 5A is a flow diagram according to an embodiment wherein the concentric servo sectors are rewritten for at least part of the disk based on the spiral tracks and the reader/writer offset errors.

FIG. 5A shows a flow diagram executed by the control circuitry 26 according to an embodiment wherein the spiral track $18_0$ is read to write a plurality of concentric servo sectors $40_0$-$40_N$ on the disk 16 that define at least one concentric servo track on the disk 16 at a first radial location (block 44). The reader/writer offset 24 is measured (block 46), and when rereading the spiral track the measured reader/writer offset is used to rewrite the at least one concentric servo track on the disk at a second radial location different from the first radial location (block 48). For example, as described above with reference to FIGS. 4A and 4B, the measured reader/writer offset may be processed to generate a reader/writer offset error which is then used to rewrite at least one of the concentric servo tracks at a different radial location.

Figure 3B:
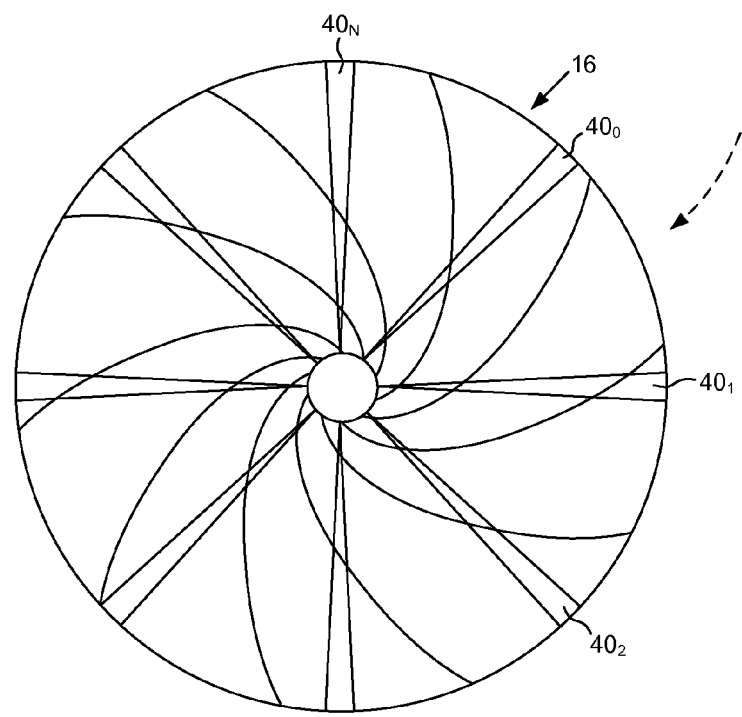
Figure 5B:
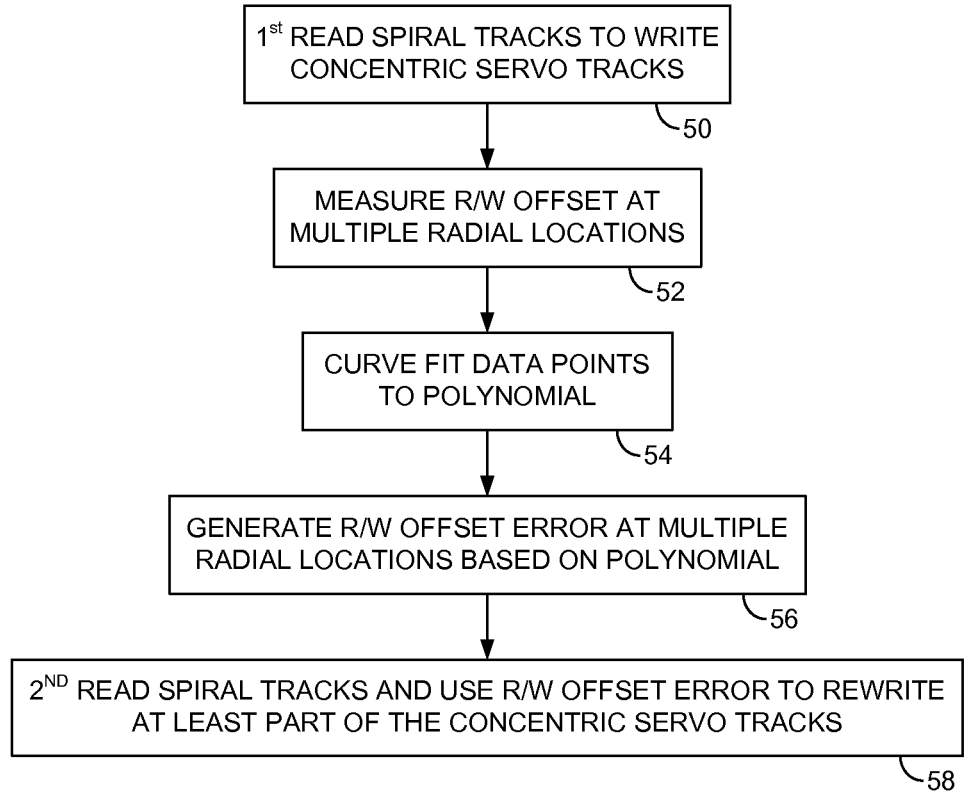
FIG. 5B is a flow diagram according to an embodiment wherein the reader/writer offset is measured at a number of discrete radial locations, the data points are curve fitted to a suitable polynomial, and a reader/writer offset error is generated at each of the different radial locations based on a difference between the measured reader/writer offset and a nominal reader/writer offset generated based on the polynomial.

FIG. 5B is a flow diagram according to an example embodiment wherein a plurality of spiral tracks $18_0$-$18_N$ are read in order to write a plurality of concentric servo sectors $40_0$-$40_N$ on the disk 16 that define at least one concentric servo track on the disk (block 50). The reader/writer offset is then measured at a plurality of radial locations (block 52) such as shown in FIG. 3A. The data points representing the measured reader/writer offsets are curve fitted to a polynomial (block 54) such as the curve 42 shown in FIG. 3A. A reader/writer offset error is generated at the plurality of radial locations (block 56), such as by computing a difference between the measured reader/writer offset and the polynomial curve. The spiral tracks $18_0$-$18_N$ are read again and the reader/writer offset error used to rewrite at least part of the concentric servo tracks (block 58), thereby reducing the read/writer offset error as shown in FIG. 3B.

Any suitable technique may be used to measure the reader/writer offset measured at block 46 of FIG. 5A or block 52 of FIG. 5B, such as the technique of reading both the spiral track $18_0$ and the concentric servo sectors $40_0$-$40_N$ as described above with reference to FIG. 2D. In an alternative embodiment, the reader/writer offset may be measured by writing a test pattern to the disk while servoing the read element 22A based on the concentric servo sectors $40_0$-$40_N$. The read element 22A may then be scanned radially over the disk and the resulting read signal evaluated to determine where the test pattern was written relative to the reader/writer offset.

In one embodiment, the process of rewriting the concentric servo sectors $40_0$-$40_N$ to reduce the variance in the track squeeze of the concentric servo tracks may be executed over a number of iterations. At each iteration, the measured reader/writer offset error is accumulated so that after each rewrite of at least part of the concentric servo tracks, the reader/writer offset error decreases. In one embodiment, the iterations may terminate when the average (and/or maximum) reader/writer offset error falls below a threshold.

In one embodiment, the reader/writer offset errors may be upsampled using any suitable technique, such as by interpolating between the measured reader/writer offsets or interpolating between the reader/writer offset errors such as shown in FIG. 4A. In this manner, a reader/writer offset error may be generated for each of the rewritten concentric servo tracks.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a spiral track;
   a head actuated over the disk, the head comprising a read element offset radially from a write element by a reader/writer offset; and
   control circuitry configured to:
      first read the spiral track to write a plurality of concentric servo sectors on the disk that define at least one concentric servo track on the disk;
      generate a first radial location measurement based on reading the spiral track;
      generate a second radial location measurement based on reading the concentric servo sectors; and
      measure the reader/writer offset based on a difference between the first and second radial location measurements.

2. The data storage device as recited in claim 1, wherein the control circuitry is further configured to:
   read the spiral track to write the plurality of concentric servo sectors on the disk to define a plurality of concentric servo tracks on the disk; and
   read the spiral track and the concentric servo sectors at a plurality of different radial locations to generate the reader/writer offset measurement at each radial location.

3. The data storage device as recited in claim 2, wherein the control circuitry is further configured to:
   curve fit the reader/writer offset measurements to a polynomial; and
   generate a reader/writer offset error at each of the different radial locations based on a difference between the measured reader/writer offset and a nominal reader/writer offset generated based on the polynomial.

4. The data storage device as recited in claim 3, wherein the control circuitry is further configured to read the spiral track and use the reader/writer offset error to rewrite at least one of the concentric servo tracks at a different radial location in order to compensate for the reader/writer offset error.

5. A data storage device comprising:
   a disk comprising a spiral track;
   a head actuated over the disk, the head comprising a read element offset radially from a write element by a reader/writer offset; and
   control circuitry configured to:
      first read the spiral track to write a plurality of concentric servo sectors on the disk that define at least one concentric servo track on the disk at a first radial location;
      measure the reader/writer offset; and
      second read the spiral track and use the measured reader/writer offset to rewrite at least one of the concentric servo tracks at a second radial location different from the first radial location.

6. The data storage device as recited in claim 5, wherein rewriting the concentric servo track compensates for an error in the measured reader/writer offset.

7. The data storage device as recited in claim 6, wherein the control circuitry is further configured to third read the spiral track and the concentric servo sectors to measure the reader/writer offset.

8. A method of operating a data storage device, the method comprising:
   using a head to first read a spiral track on a disk to write a plurality of concentric servo sectors on the disk that define at least one concentric servo track on the disk;
   generating a first radial location measurement based on reading the spiral track;
   generating a second radial location measurement based on reading the concentric servo sectors; and measuring a reader/writer offset between a read element of the head and a write element of the head based on a difference between the first and second radial location measurements.

9. The method as recited in claim 8, further comprising:

reading the spiral track to write the plurality of concentric servo sectors on the disk to define a plurality of concentric servo tracks on the disk; and reading the spiral track and the concentric servo sectors at a plurality of different radial locations to generate the reader/writer offset measurement at each radial location.

10. The method as recited in claim 9, further comprising:

curve fitting the reader/writer offset measurements to a polynomial; and generating a reader/writer offset error at each of the different radial locations based on a difference between the measured reader/writer offset and a nominal reader/writer offset generated based on the polynomial.

11. The method as recited in claim 10, further comprising reading the spiral track and using the reader/writer offset error to rewrite at least one of the concentric servo tracks at a different radial location in order to compensate for the reader/writer offset error.

12. A method of operating a data storage device, the method comprising:

using a head to first read a spiral track on a disk to write a plurality of concentric servo sectors on the disk that define at least one concentric servo track on the disk at a first radial location;

measuring a reader/writer offset between a read element of the head and a write element of the head; and using the head to second read the spiral track and using the measured reader/writer offset to rewrite at least one of the concentric servo tracks at a second radial location different from the first radial location.

13. The method as recited in claim 12, wherein rewriting the concentric servo track compensates for an error in the measured reader/writer offset.

14. The method as recited in claim 13, further comprising third reading the spiral track and the concentric servo sectors to measure the reader/writer offset.

* * * * *